(12) United States Patent
Yamaguchi (10) Patent No.: US 11,327,428 B2
(45) Date of Patent: May 10, 2022

(54) DRIVE TRANSMISSION APPARATUS THAT TRANSMITS A DRIVE FORCE USING A BELT AND AN IMAGE FORMING APPARATUS INCLUDING A DRIVE TRANSMISSION APPARATUS

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/127,543

(22) Filed: Dec. 18, 2020

(65) Prior Publication Data

US 2021/0191307 A1    Jun. 24, 2021

(30) Foreign Application Priority Data

Dec. 18, 2019    (JP) .............................. JP2019-228101

(51) Int. Cl.
*G03G 15/00*    (2006.01)
*F16H 7/02*    (2006.01)
*B65H 29/12*    (2006.01)

(52) U.S. Cl.
CPC ........... *G03G 15/757* (2013.01); *B65H 29/12* (2013.01); *F16H 7/02* (2013.01); *B65H 2403/81* (2013.01); *B65H 2403/82* (2013.01); *B65H 2404/2511* (2013.01)

(58) Field of Classification Search
CPC ............. G03G 15/757; G03G 21/1647; G03G 21/1857; G03G 2221/1657; F16H 7/02; B65H 29/12; B65H 2403/81; B65H 2403/82; B65H 2404/2511
See application file for complete search history.

(56) References Cited

U.S. PATENT DOCUMENTS

| 2014/0064752 A1* | 3/2014 | Tsuji ..................... F16H 7/02 474/84 |
| 2018/0264857 A1* | 9/2018 | Yamaguchi .......... G03G 15/757 |

FOREIGN PATENT DOCUMENTS

JP    2016-001059 A    1/2016

\* cited by examiner

*Primary Examiner* — Sophia S Chen
(74) *Attorney, Agent, or Firm* — Hawaii Patent Services; Nathaniel K. Fedde; Kenton N. Fedde (57) ABSTRACT

Provided is an image forming apparatus that together with being able to suppress rotation unevenness is capable of preventing unexpected downtime due to a broken belt. A guide member guides the swing of a swing gear on an arc that connects a first position where the swing gear is engaged with an idle gear, and a second position where the swing gear is not engaged with the idle gear. A transmission cutoff mechanism cuts off transmission of a drive force transmitted to a driven pulley via a belt to a driven shaft when a motor rotates in the reverse direction. A control unit, in a case where rotation unevenness meets a condition, causes the swing gear to swing to the first position by reverse rotation of the motor, which causes the drive force to be transmitted to the driven shaft.

3 Claims, 10 Drawing Sheets

DRIVE TRANSMISSION APPARATUS THAT TRANSMITS A DRIVE FORCE USING A BELT AND AN IMAGE FORMING APPARATUS INCLUDING A DRIVE TRANSMISSION APPARATUS

INCORPORATION BY REFERENCE

This application is based on and claims the benefit of priority from Japanese Patent Application No. 2019-228101 filed on Dec. 18, 2019, the contents of which are hereby incorporated by reference.

BACKGROUND

The present disclosure relates to a drive transmission apparatus that transmits a drive force using a belt and an image forming apparatus including a drive transmission apparatus.

An electrophotographic image forming apparatus is provided with a photoconductor drum as an image carrier. A drive transmission apparatus in which a metal belt is wound around a drive shaft or drive pulley on the motor side and a driven pulley on the photoconductor drum side is typically used as an apparatus for transmitting a drive force to a photoconductor drum. In such a drive transmission apparatus, in a case where the belt becomes scratched or meanders due to long-term use, the durability of the belt and the rotation speed of the photoconductor drum are adversely affected, and in a case where the belt breaks, transmission of the drive force becomes impossible. As a result there is a problem in that downtime occurs in which the image forming apparatus cannot be used.

Therefore, conventionally, a technique for preventing the occurrence of unexpected downtime due to belt breakage of the drive transmission apparatus has been studied. For example, in a typical technique, a drive device having a unit, a biasing member, and an auxiliary transmission unit has been proposed. The unit supports a motor. The biasing member presses the unit in a direction in which the drive shaft is separated from the output shaft. The auxiliary transmission unit is connected to the drive shaft as the metal belt breaks, and transmits the rotational drive force of the drive shaft to the output shaft.

SUMMARY

In order to solve the problem described above, the drive transmission apparatus according to the present disclosure includes a motor, a drive shaft, a driven shaft, a driven pulley, a belt, a drive gear, a driven gear, an idle gear, a swing gear, a guide member, a transmission cutoff mechanism, a measurement unit, and a control unit. The motor is capable of rotating in the forward direction and in the reverse direction. The drive shaft is driven by the motor. The driven shaft is provided at a position that is separated in a radial direction from the drive shaft. The driven pulley is provided on the driven shaft. The belt is wound around the drive shaft and the driven pulley. The drive gear is provided on the drive shaft. The driven gear is provided on the driven shaft and not engaged with the drive gear. The idle gear is engaged with the driven gear. The swing gear is engaged with the drive gear. The guide member guides a swing of the swing gear on an arc that is centered on the drive shaft and that connects a first position where the swing gear is engaged with the idle gear, and a second position where the swing gear is not engaged with the idle gear. The transmission cutoff mechanism, in a case where the motor is rotated in the forward direction, transmits a drive force that is transmitted to the driven pulley via the belt to the driven shaft; and in a case where the motor is rotated in the reverse direction, cuts off transmission of a drive force that is transmitted to the driven pulley via the belt to the driven shaft. The measurement unit measures rotation unevenness of the driven shaft. The control unit controls the motor. The control unit, in a case where the rotation unevenness measured by the measurement unit does not meet a condition indicating a limit of the rotation unevenness, causes the swing gear to swing to the second position by forward rotation of the motor, which causes drive force to be transmitted to the driven shaft via the belt and driven pulley. Moreover, the control unit, in a case where the rotation unevenness meets the condition, causes the swing gear to swing to the first position by reverse rotation of the motor, which causes drive force to be transmitted to the driven shaft via the drive gear, the swing gear, the idle gear and the driven gear.

DETAILED DESCRIPTION

First Embodiment

Hereinafter, a printer 1 (an example of an image forming apparatus) and a drive transmission apparatus 31 of a first embodiment according to the present disclosure will be described with reference to the drawings.

Figure 1:
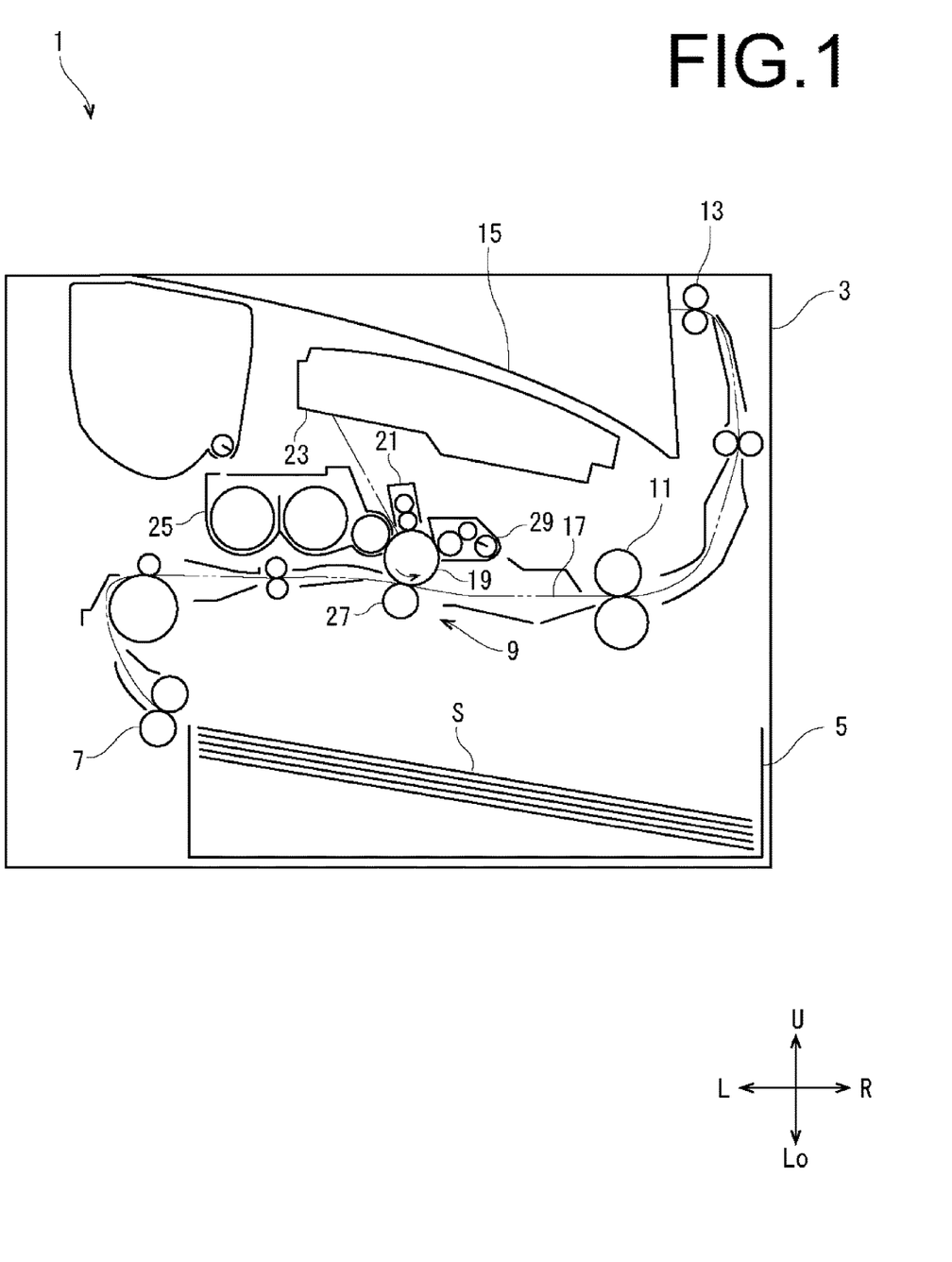
FIG. 1 is a front view schematically showing an internal configuration of a printer according of a first embodiment according to the present disclosure.

First, the overall configuration of the printer 1 will be described with reference to FIG. 1. FIG. 1 is a front view schematically illustrating the internal configuration of the printer 1. Hereinafter, the front side of the paper surface in FIG. 1 is taken to be the front surface side (front side) of the printer 1, and the left-right orientation will be described with reference to the direction in which the printer 1 is viewed from the front. In each figure, U, Lo, L, R, Fr, and Rr indicate top, bottom, left, right, front, and rear, respectively.

The main body portion 3 of the printer 1 is provided with a paper-supply cassette 5, a paper-feed device 7, an image forming unit 9, a fixing device 11, a discharge device 13, and a discharge tray 15. Sheets S are housed in the paper-supply cassette 5. The paper-feed device 7 feeds out a sheet S from the paper-supply cassette 5. The image forming unit 9 forms a toner image on the sheet S. The fixing device 11 fixes the toner image on the sheet S. The discharge device 13 discharges the sheet S. Discharged sheets S are stacked in the discharge tray 15. A conveying path 17 is formed in the main body portion 3 from the paper-feed device 7 to the discharge device 13 via the image forming unit 9 and the fixing device 11.

The image forming unit 9 includes a photoconductor drum 19, a charging device 21, an exposing device 23, a developing device 25, a transfer roller 27, and a cleaning device 29. The charging device 21, the developing device 25, the transfer roller 27, and the cleaning device 29 are arranged along the rotation direction around the photoconductor drum 19 in the order of the charging device 21, the developing device 25, the transfer roller 27, and the cleaning device 29. The photoconductor drum 19 is driven by a drive transmission apparatus 31 described later, and rotates in the clockwise direction in FIG. 1.

A sheet S that is fed from the paper-supply cassette 5 by the paper-feed device 7 is conveyed to the image forming unit 9 along the conveying path 17. After the photoconductor drum 19 is charged to a specific potential by the charging device 21, a latent image is written on the photoconductor drum 19 by being exposed by the exposing device 23. Next, a toner image is formed by developing the electrostatic latent image by the developing device 25. The toner image is transferred to the sheet S by the transfer roller 27 and fixed to the sheet S by the fixing device 11. The sheet S on which the toner image is fixed is stacked on the discharge tray 15 by the discharge device 13. The toner remaining on the surface of the photoconductor drum 19 is removed by the cleaning device 29.

Figure 2:
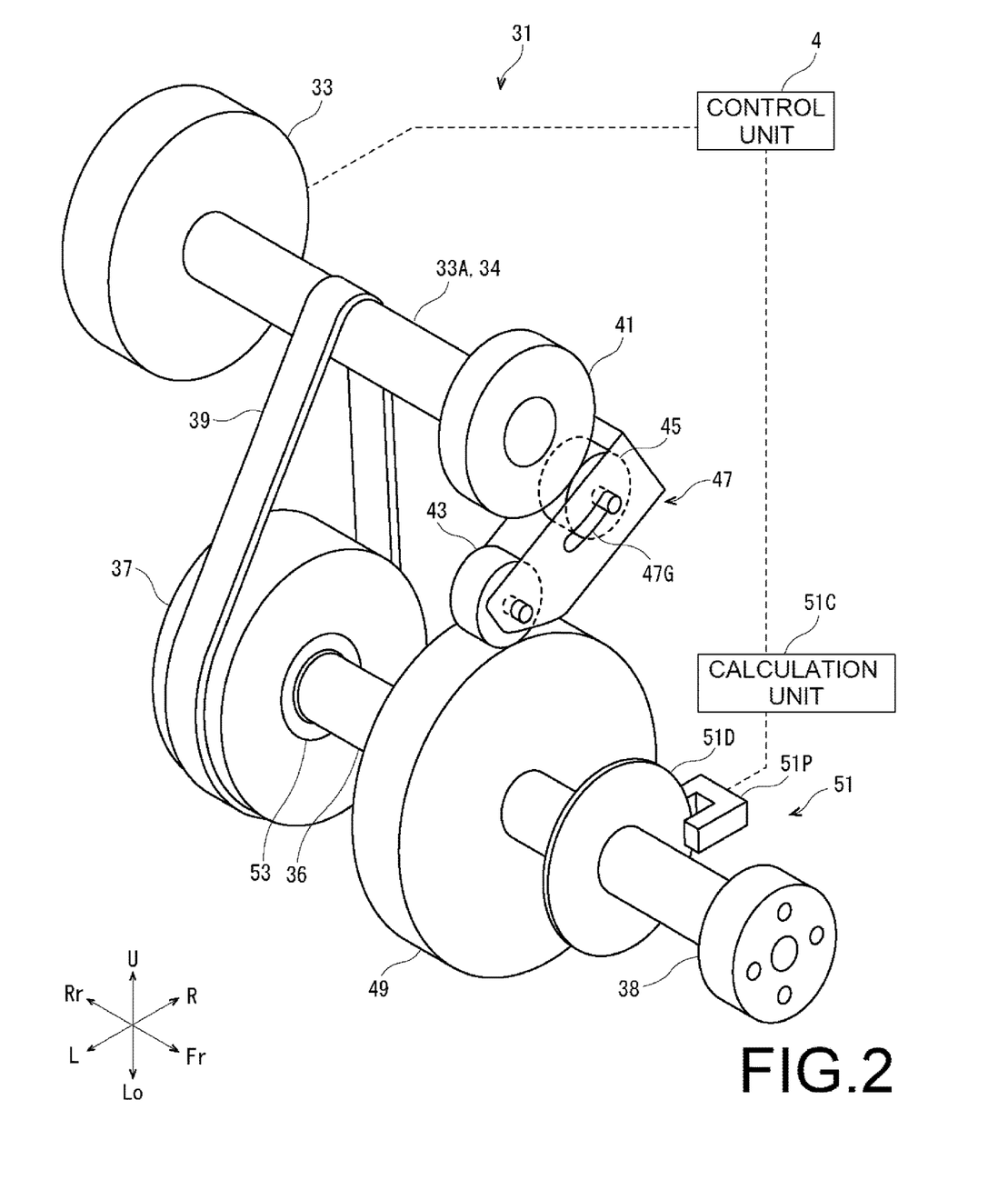
FIG. 2 is a perspective view of a drive transmission apparatus of a first embodiment according to the present disclosure.
Figure 3:
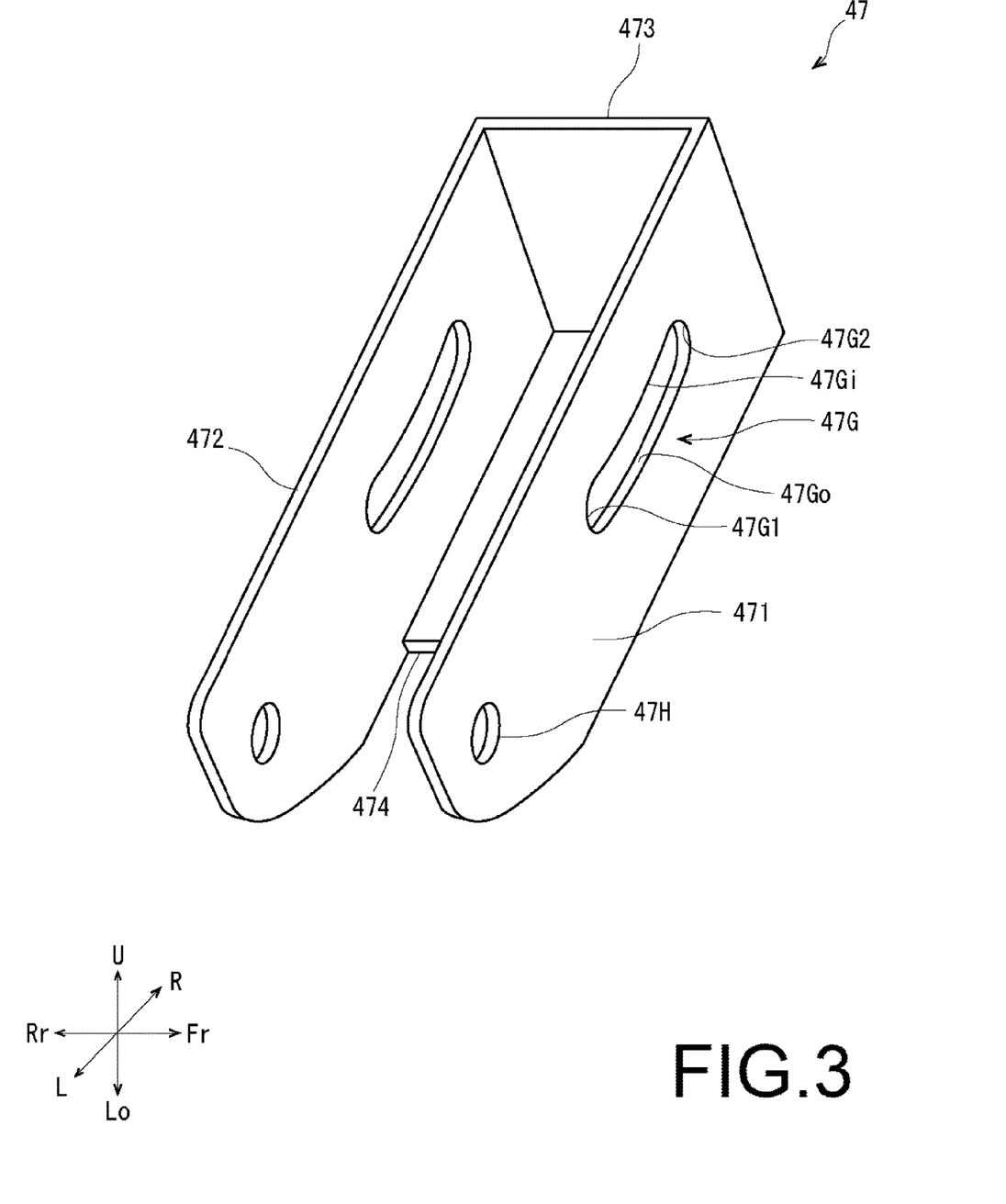
FIG. 3 is a perspective view of a guide member of a first embodiment according to the present disclosure.

Next, the configuration of the drive transmission apparatus 31 will be described with reference to FIGS. 2 and 3. FIG. 2 is a perspective view of the drive transmission apparatus 31. FIG. 3 is a perspective view of the guide member 47.

The drive transmission apparatus 31 includes a motor 33, a drive shaft 34, a driven shaft 36, a driven pulley 37, a belt 39, a drive gear 41, a driven gear 49, an idle gear 43, a swing gear 45, a guide member 47, a transmission cutoff mechanism 53, a measurement unit 51, and a control unit 4. The motor 33 is able to rotate in the forward direction and in the reverse direction. The drive shaft 34 is driven by the motor 33. The driven shaft 36 is provided at a position that is separated in the radial direction from the drive shaft 34. The driven pulley 37 is provided on the driven shaft 36. The belt 39 is wound around the drive shaft 34 and the driven pulley 37. The drive gear 41 is provided on the drive shaft 34. The driven gear 49 is provided on the driven shaft 36. The driven gear 49 is not engaged with the drive gear 41 but is engaged with the idle gear 43. The swing gear 45 is engaged with the drive gear 41. The guide member 47 guides the swing of the swing gear 45 on an arc that is centered on the drive shaft 34 and that connects a first position where the swing gear 45 is engaged with the idle gear 43, and a second position where the swing gear 45 is not engaged with the idle gear 43. The transmission cutoff mechanism 53 transmits the drive force that is transmitted to the driven pulley 37 via the belt 39 to the driven shaft 36 in a case where the motor 33 rotates in the forward direction, and cuts off transmission of the drive force that is transmitted to the driven pulley 37 via the belt 39 to the driven shaft 36 in a case where the motor 33 rotates in the reverse direction. The measurement unit 51 measures the rotation unevenness FL of the driven shaft 36. The control unit 4 controls the measurement unit 51 and the motor 33. In a case where the rotation unevenness FL measured by the measurement unit 51 does not meet specified conditions, the control unit 4 causes the swing gear 45 to swing to the second position by forward rotation of the motor 33, which causes the drive force to be transmitted to the driven shaft 36 via the belt 39 and driven pulley 37. Then, in a case where the rotation unevenness FL meets a condition indicating the limit of the rotation unevenness FL, the control unit 4 causes the swing gear 45 to swing to the first position by reverse rotation of the motor 33, which causes the drive force to be transmitted to the driven shaft 36 via the drive gear 41, the swing gear 45, the idle gear 43 and the driven gear 49.

The drive transmission apparatus 31 is provided behind the photoconductor drum 19 and is housed in a housing fixed to the main body portion 3. Note that in the following example, the drive transmission apparatus 31 is arranged in a position in which the driven shaft 36 is located below the drive shaft 34; however, the drive transmission apparatus 31 may be arranged in another position.

[Motor, Drive Shaft]

The motor 33 is arranged with the front-rear direction as the axial direction of the output shaft 33A, and is fixed to the housing. The motor 33 is able to rotate in the forward direction and in the reverse direction. The drive shaft 34 is integrally formed with the output shaft 33A in front of the motor 33, and also functions as a drive pulley for driving the belt 39.

[Driven Shaft, Driven Pulley, Belt]

The driven shaft 36 is provided at a position separated downward from the drive shaft 34 with the front-rear direction as the axial direction. Both the front and rear end portions of the driven shaft 36 are supported by bearings fixed to the housing. The driven pulley 37 is provided on the driven shaft 36. The outer circumferential surface of the driven pulley 37 is crowned in a shape that bulges outward in the radial direction. The belt 39 is a seamless continuous belt made of a non-magnetic metal material (for example, SUS304), and wound around the drive shaft 34 and the driven pulley 37. In a case in which the motor 33 rotates in the forward direction, the driven pulley 37 rotates in the forward direction due to transmission of the drive force via the drive shaft 34 and the belt 39. Similarly, in a case where the motor 33 rotates in the reverse direction, the driven pulley 37 rotates in the reverse direction.

[Drive Gear, Driven Gear, Idle Gear]

The drive gear 41 is fixed to a portion of the drive shaft 34 that is further on the front side than the portion around which the belt 39 is wound. The driven gear 49 is fixed to the driven shaft 36 below the drive gear 41. The addendum circle of the drive gear 41 and the addendum circle of the driven gear 49 are separated from each other. The idle gear 43 is provided at a position between the driven gear 49 and the drive gear 41 with the front-rear direction as the axial direction. The idle gear 43 is engaged with the driven gear 49 and is not engaged with the drive gear 41. The rotating shaft 43A of the idle gear 43 is supported by a guide member 47 described later.

[Swing Gear, Guide Member]

The swing gear 45 is provided on the lower right side of the drive gear 41 with the front-rear direction as the axial direction, and is engaged with the drive gear 41. The guide member 47 (see FIG. 3) includes a first side plate 471, a second side plate 472, a third side plate 473, and a bottom plate 474. The first side plate 471 on the front side and the second side plate 472 on the rear side face each other in the front-rear direction. The third side plate 473 connects the right end portion of the first side plate 471 and the right end portion of the second side plate 472. The bottom plate 474 connects the lower portion of the first side plate 471 and the lower portion of the second side plate 472. In addition, the guide member 47 is open in the upper portion and the left end portion.

Support holes 4711 for supporting the rotating shaft 43A of the idle gear 43 are formed in the first side plate 471 and the second side plate 472. The support holes 4711 are circular holes corresponding to the outer circumferential surface of the rotating shaft 43A of the idle gear 43.

Moreover, guide holes 47G for guiding the swing of the swing gear 45 are formed in the first side plate 471 and the second side plate 472. The guide holes 47G include an inner arc portion 47Gi, an outer arc portion 47Go, a first end portion 47G1 and a second end portion 47G2. The inner arc portion 47Gi and the outer arc portion 47Go are formed in an arc shape centered on the drive shaft 34, and the radius of curvature of the inner arc portion 47Gi is smaller than the radius of curvature of the outer arc portion 47Go. The inner arc portion 47Gi and the outer arc portion 47Go come into contact with the rotating shaft 45A of the swing gear 45 at two points in the radial direction of the drive shaft 34, which together with guiding the swing of the swing gear 45 on an arc centered on the drive shaft 34, regulates the movement of the swing gear 45 in the radial direction of the drive shaft 34.

The first end portion 47G1 and the second end portion 47G2 are formed in a semicircular shape corresponding to the outer circumferential surface of the rotating shaft 45A of the swing gear 45. The first end portion 47G1 comes in contact with the rotating shaft 45A at the first position where the swing gear 45 is engaged with the idle gear 43, and regulates the swing of the rotating shaft 45A toward the upstream side in the forward rotation direction of the drive gear 41. The second end portion 47G2 comes in contact with the rotating shaft 45A at the second position where the swing gear 45 is engaged with the idle gear 43, which regulates the swing of the rotating shaft 45A toward the downstream side in the forward rotation direction of the drive gear 41.

With this configuration, the guide member 47 guides the swing of the swing gear 45 on an arc that is centered on the drive shaft 34 and that connects the first position where the swing gear 45 is engaged with the idle gear 43, and a second position where the swing gear 45 is not engaged with the idle gear 43. The engagement between the drive gear 41 and the swing gear 45 is always maintained regardless of the position of the swing gear 45. In the case where the swing gear 45 is located at the first position, a gear train is configured by the drive gear 41, the swing gear 45, the idle gear 43, and the driven gear 49. The reduction ratio of this gear train is set to be equal to the reduction ratio of the belt 39 and the driven pulley 37.

Note that the drive gear 41, the idle gear 43, the swing gear 45, and the driven gear 49 may be spur gears or helical gears.

[Transmission Cutoff Mechanism]

The transmission cutoff mechanism 53 is, for example, a ratchet, and includes a saw blade-shaped sliding surface that is formed on the inner circumferential surface of the driven pulley 37 (or the outer circumferential surface of the driven shaft 36), and a swingable claw provided on the outer circumferential surface of the driven shaft 36 (or the inner circumferential surface of the driven pulley 37) and biased toward the sliding surface. The ratchet, in a case where the drive force is transmitted to the driven pulley 37 via the belt 39 by the forward rotation of the motor 33, transmits a drive force from the driven pulley 37 to the driven shaft 36 by the tip end portion of the claw engaging with a portion in a valley of the sliding surface. Then, in a case where the drive force is transmitted to the driven pulley 37 via the belt 39 due to the reverse rotation of the motor 33, the tip end portion of the claw slides on the sliding surface, which cuts off the transmission of the drive force from the driven pulley 37 to the driven shaft 36.

[Measurement Unit]

The measurement unit 51 is, for example, an optical rotary encoder, and includes a light-shielding plate 51D, a photo interrupter 51P, and a calculation unit 51C. The light-shielding plate 51D is a disk in which a plurality of slits extending in a radial shape are formed at equal intervals, and is fixed to a portion of the driven shaft 36 further on the than the driven gear 49. The photo interrupter 51P is fixed to the housing and outputs a pulse signal having a level that changes alternately by the rotation of the light-shielding plate 51D. The calculation unit 51C includes, for example, an F/V converter that outputs a voltage proportional to the frequency of the pulse signal, and an FFT analyzer that analyzes the frequency of the outputted voltage. Then, the calculation unit 51C analyzes the pulse signal that is outputted from the photo interrupter 51P, calculates the rotation unevenness FL of the driven shaft 36 (ratio of the actual rotation speed to the set rotation speed), and outputs data indicating the rotation unevenness FL to the control unit 4.

[Control Unit]

The control unit 4 may be realized by software using a processor, or may be realized by a logic circuit (hardware) formed in an integrated circuit or the like. In a case where a processor is used, various processes are performed by the processor reading and executing a program stored in memory. As the processor, for example, a CPU (Central Processing Unit) is used. The memory includes a storage medium such as a ROM (Read Only Memory), a RAM (Random Access Memory), an EEPROM (Electrically Erasable Programmable Read Only Memory), and the like. A control program used for controlling each part of the printer 1 is stored in the memory.

[Operation of the Drive Transmission Apparatus]

Figure 4:
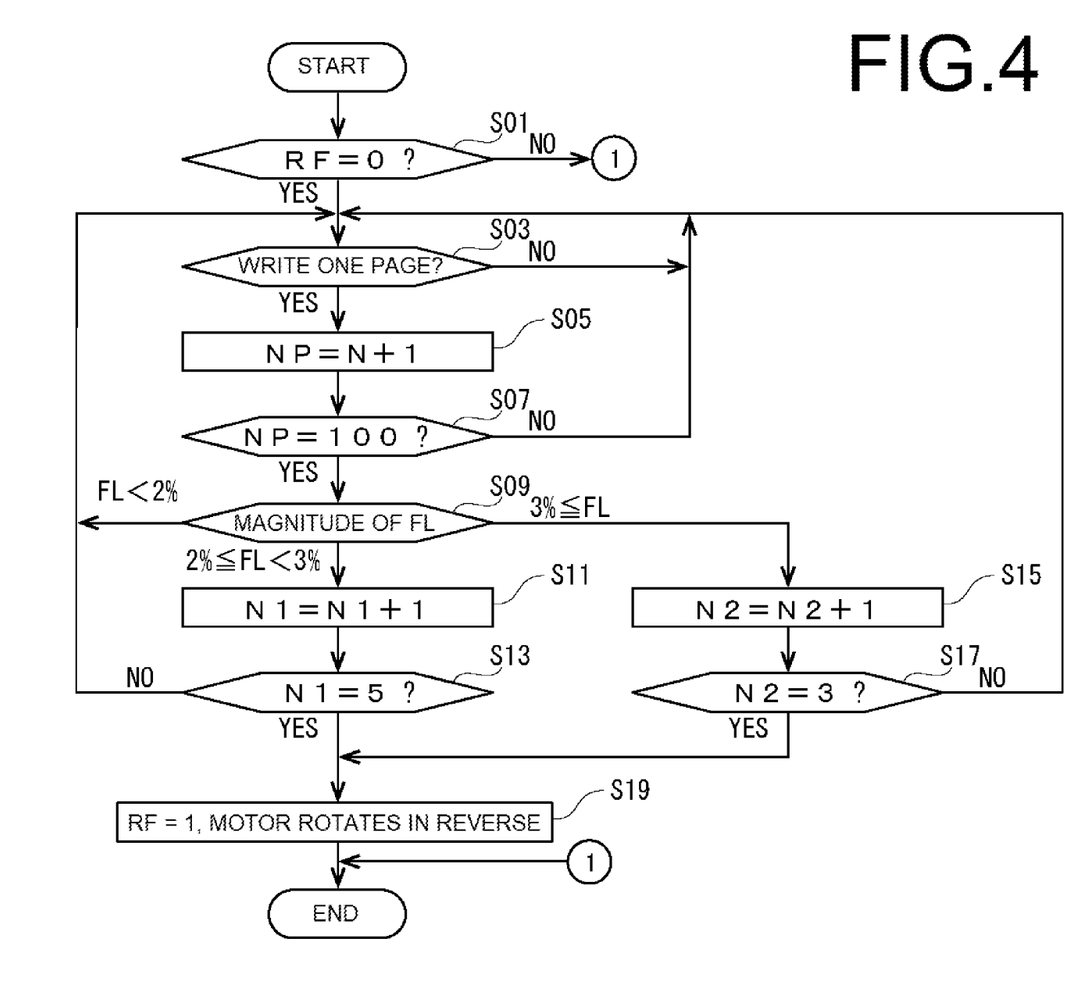
FIG. 4 is a flow chart illustrating a procedure of drive transmission control executed by a control unit of a first embodiment according to the present disclosure.
Figure 5A:
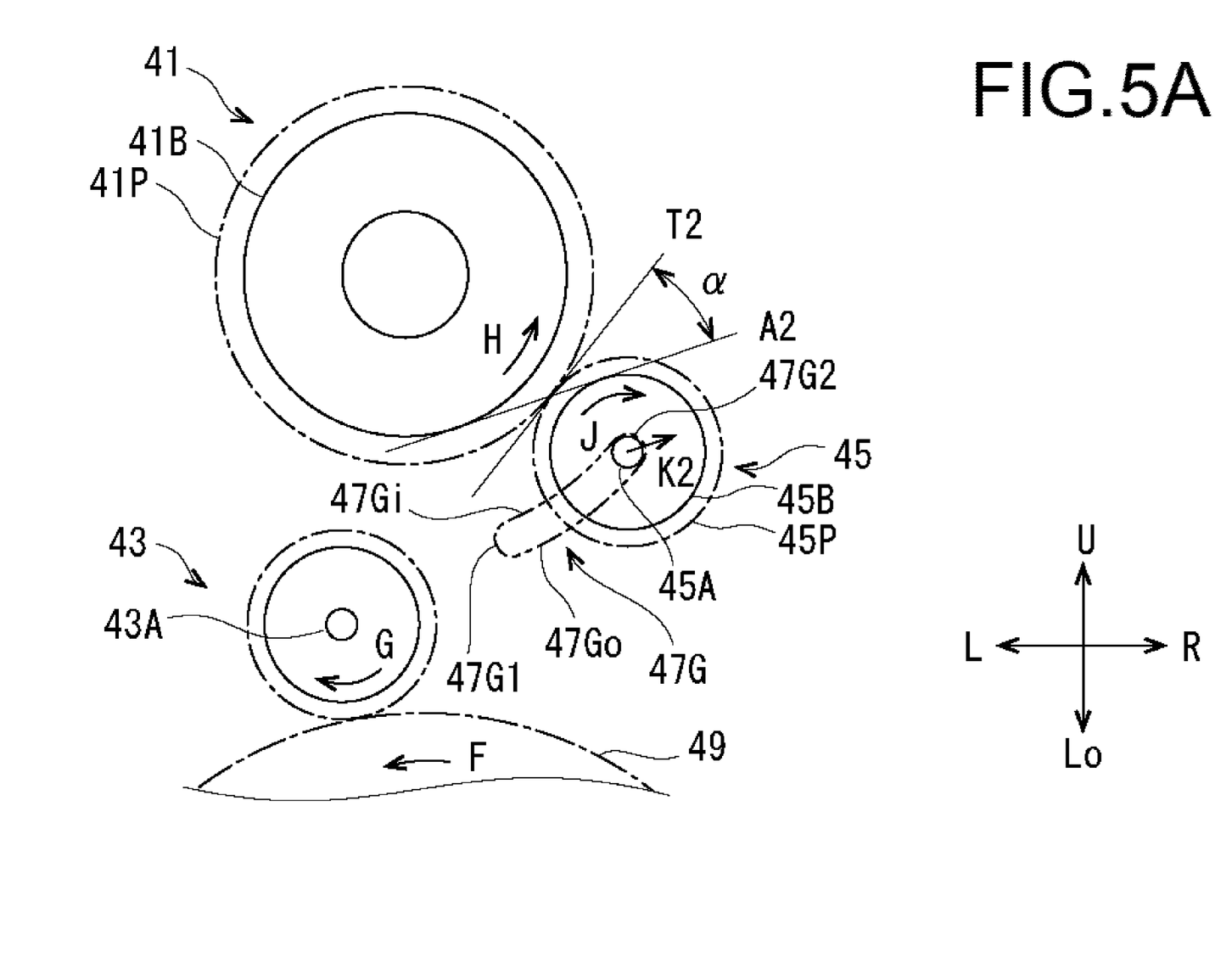
FIG. 5A is a front view illustrating the operation of a swing gear in a case where a drive gear of a first embodiment according to the present disclosure rotates in the forward direction.
Figure 5B:
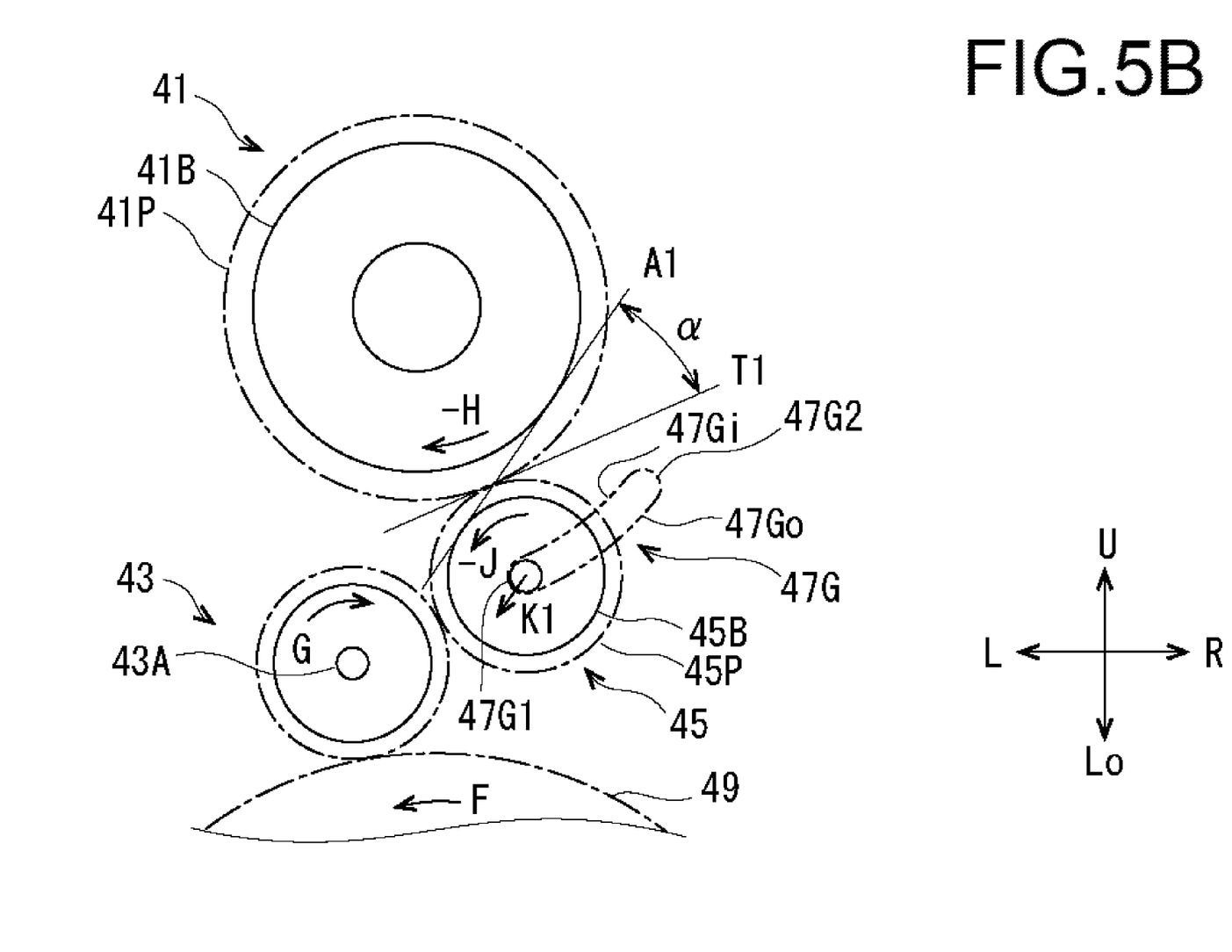
FIG. 5B is a front view illustrating the operation of a swing gear in a case where a drive gear of a first embodiment according to the present disclosure rotates in the reverse direction.
Figure 6:
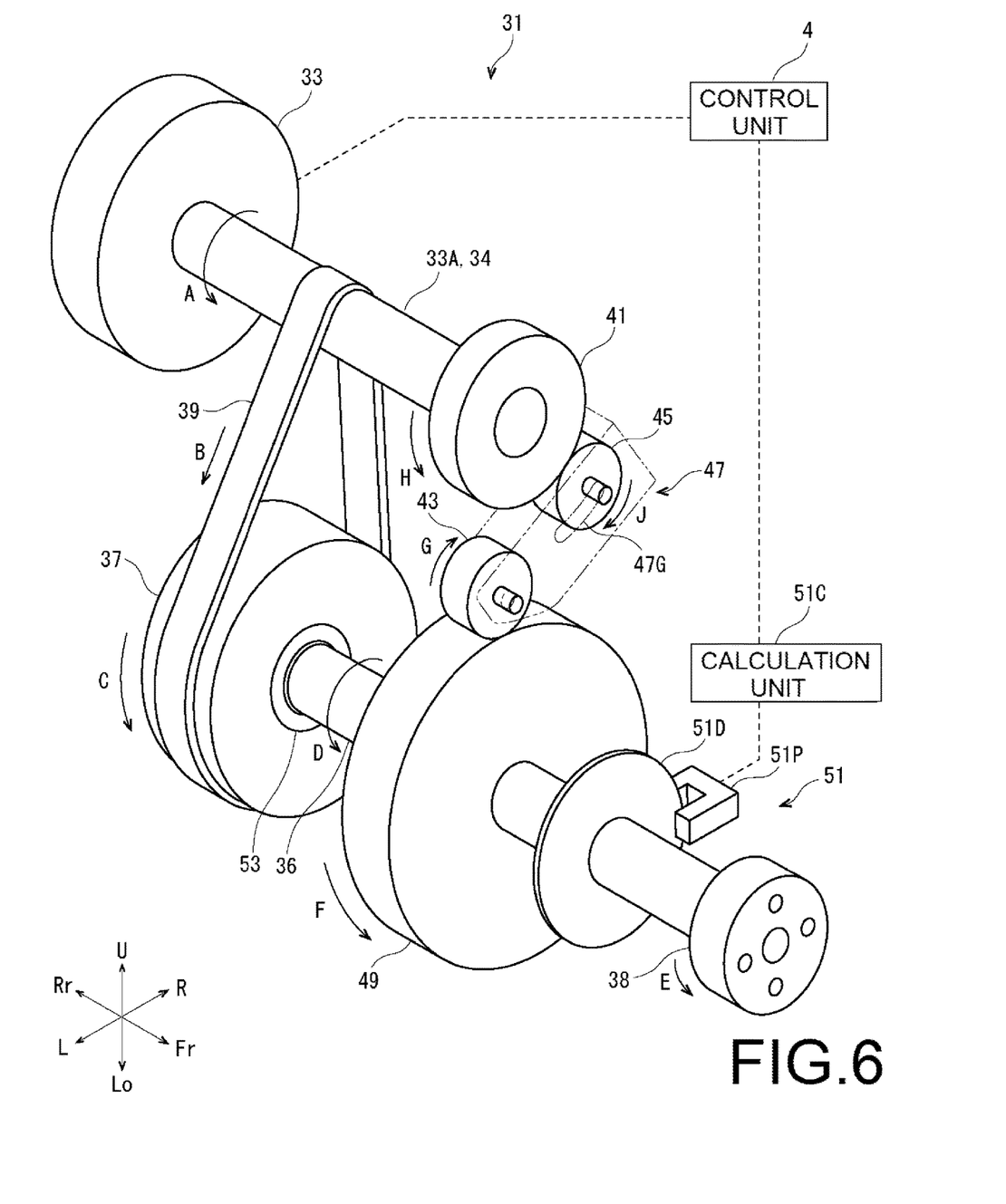
FIG. 6 is a perspective view illustrating the operation of each part in a case where a drive gear of a first embodiment according to the present disclosure rotates in the forward direction.
Figure 7:
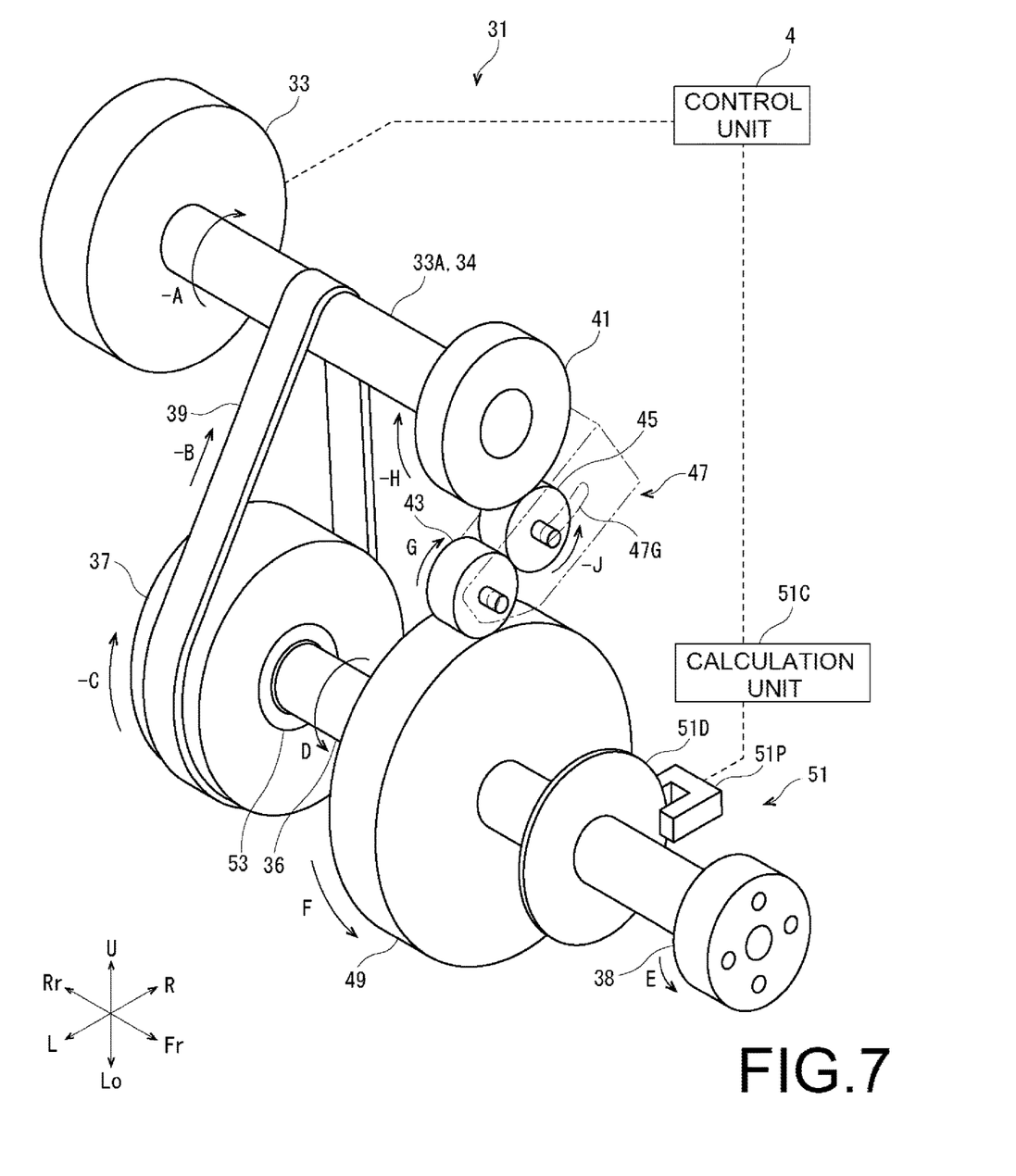
FIG. 7 is a perspective view illustrating the operation of each part in a case where a drive gear of a first embodiment according to the present disclosure rotates in the reverse direction.

Next, the operation of the drive transmission apparatus 31 will be described with reference to FIGS. 4 to 7. FIG. 4 is a flow chart illustrating a procedure of drive transmission control executed by the control unit 4. FIG. 5A is a front view illustrating the operation of the swing gear 45 in a case where the drive gear 41 rotates in the forward direction. FIG. 5B is a front view illustrating the operation of the swing gear 45 in a case where the drive gear 41 rotates in the reverse direction. FIG. 6 is a perspective view illustrating the operation of each part in a case where the drive gear 41 rotates in the forward direction. FIG. 7 is a perspective view illustrating the operation of each part in a case where the drive gear 41 rotates in the reverse direction.

When the power to the printer 1 is turned ON, the control unit 4 executes the drive transmission control illustrated in FIG. 4 while monitoring the operation of the image forming unit 9. The EEPROM provided in the control unit 4 stores a first rotation unevenness counter N1, a second rotation unevenness counter N2, a page number counter NP, and a rotation direction flag RF (the initial values are all 0).

First, the control unit 4 determines whether or not the rotation direction flag RF is 0 (step S01). In a case where the rotation direction flag RF is 0, the power supply is set so as to rotate the motor 33 in the forward direction. In a case where the rotation direction flag RF is rewritten to 1 in step S19 described later, the power supply setting is switched so as to rotate the motor 33 in the reverse direction. In a case where it is determined that the rotation direction flag RF is not 0 (step S01: NO), the control unit 4 ends the drive transmission control. In a case where it is determined that the rotation direction flag RF is 0 (step S01: YES), the control unit 4 moves to the process of step S03.

Here, the operation of the drive transmission apparatus 31 in a case where the rotation direction flag RF is 0 will be described. In a case where the rotation direction flag RF is 0, the control unit 4 rotates the motor 33 in the forward direction, which rotates the drive shaft 34 and the drive gear 41 in the forward direction (A direction and H direction in FIG. 6). The action line A2 illustrated in FIG. 5A is a common tangent line between the base circle 41B of the drive gear 41 and the base circle 45B of the swing gear 45. The angle α formed by the common tangent line T2 of the pitch circle 41P of the drive gear 41 and the pitch circle 45P of the swing gear 45 and the action line A2 is the pressure angle. The teeth of the drive gear 41 that rotates in the forward direction transmit a drive force to the teeth of the swing gear 45 in the direction of the action line A2. This drive force acts as a force for rotating the swing gear 45 in the J direction and pushing the swing gear 45 in the K2 direction. By the swing gear 45 being pushed in the K2 direction, the rotating shaft 45A of the swing gear 45 is pressed against the second end portion 47G2 of the guide hole 47G. As a result, the swing gear 45 is rotated in a second position where the swing gear 45 is not engaged with the idle gear 43.

At this time, as illustrated in FIG. 6, by the drive shaft 34 orbiting the belt 39 in the B direction, the driven pulley 37 is rotated forward in the C direction, and the transmission cutoff mechanism 53 transmits the drive force from the driven pulley 37 to the driven shaft 36, which causes the driven shaft 36 to rotate in the D direction. As a result, the drive force in the E direction is transmitted to the photoconductor drum 19 via a shaft joint 38. Here, the rotation of the driven shaft 36 in the D direction causes the driven gear 49 to rotate in the F direction and the idle gear 43 to rotate in the G direction, respectively; however, the idle gear 43 is not engaged with the swing gear 45, so the rotation of the swing gear 45 does not affect the drive of the driven shaft 36.

In step S03, the control unit 4 determines whether or not a latent image for one page has been written on the photoconductor drum 19 by the exposing device 23. In a case where it is determined that a latent image for one page has not been written (step S03: NO), the control unit 4 repeats the process of step S03. On the other hand, in a case where it is determined that the latent image for one page has been written (step S03: YES), the control unit 4 moves to the process of step S05 and adds 1 to the page number counter NP.

Next, the control unit 4 determines whether or not the page number counter NP has reached 100 (step S07). In a case where it is determined that the page number counter NP has not reached 100 (step S07: NO), the control unit 4 repeats the process starting from step S03. On the other hand, in a case where it is determined that the page number counter NP has reached 100 (step S07: YES), the control unit 4 moves to the process of step S09, and determines the magnitude of the rotation unevenness FL measured by the measurement unit 51. More specifically, in a case where the control unit 4 determines that the rotation unevenness FL is less than 2% (step S09: FL<2%), the control unit 4 repeats the process starting from step S03. Moreover, in a case where it is determined that the rotation unevenness FL is 2% or more and less than 3% (step S09: 2% FL<3%), the process proceeds to step S11. Furthermore, in a case where it is determined that the rotation unevenness FL is 3% or more (step S09: 3% FL), the process proceeds to step S15.

In step S11, the control unit 4 adds 1 to the first rotation unevenness counter N1, then proceeds to the process of step S13, and determines whether or not the value of the first rotation unevenness counter N1 has reached 5. In a case where it is determined that the first rotation unevenness counter N1 has not reached 5 (step S13: NO), the control unit 4 repeats the process starting from step S03. On the other hand, in a case where it is determined that the value of the first rotation unevenness counter N1 has reached 5 (step S13: YES), the control unit 4 moves to the process of step S19. Then, the rotation direction flag RF is rewritten to 1, and the power supply setting is switched so as to rotate the motor 33 in the reverse direction. The drive transmission control is then terminated.

On the other hand, in step S15, the control unit 4 adds 1 to the second rotation unevenness counter N2, then proceeds to the process of step S17, and determines whether or not the value of the second rotation unevenness counter N2 has reached 3. In a case where it is determined that the second rotation unevenness counter N2 has not reached 3 (step S17: NO), the control unit 4 repeats the process starting from step S03. On the other hand, in a case where it is determined that the value of the second rotation unevenness counter N2 has reached 3 (step S17: YES), the control unit 4 moves to the process of step S19. Then, the rotation direction flag RF is rewritten to 1, and the power supply setting is switched so as to rotate the motor 33 in the reverse direction. The drive transmission control is then terminated.

Note that the values of the first rotation unevenness counter N1, the second rotation unevenness counter N2, the page number counter NP, and the rotation direction flag RF are stored in the EEPROM of the control unit 4, so is not deleted even in a case where the power to the printer 1 is turned OFF. These values are read by the control unit 4 after the power is turned ON the next time, and drive transmission control is performed with the read values as initial values.

Here, the operation of the drive transmission apparatus 31 in a case where the rotation direction flag RF is 1 will be described. In a case where the rotation direction flag RF is 1, the control unit 4 rotates the motor 33 in the reverse direction, which rotates the drive shaft 34 and the drive gear 41 in the reverse direction (−A direction and −H direction in FIG. 6). The action line A1 illustrated in FIG. 5A is a common tangent line between the base circle 41B of the drive gear 41 and the base circle 45B of the swing gear 45. The angle α formed by the common tangent line T1 of the pitch circle 41P of the drive gear 41 and the pitch circle 45P of the swing gear 45 and the action line A1 is the pressure angle. The teeth of the drive gear 41 that rotates in the reverse direction transmit a drive force to the teeth of the swing gear 45 in the direction of the action line A1. This drive force acts as a force for rotating the swing gear 45 in the −J direction and pushing the swing gear 45 in the K1 direction. By the swing gear 45 being pushed in the K1 direction, the rotating shaft 45A of the swing gear 45 is pressed against the first end portion 47G1 of the guide hole 47G. As a result, the swing gear 45 is rotated in a first position where the swing gear 45 is engaged with the idle gear 43.

At this time, as illustrated in FIG. 7, the idle gear 43 is rotated in the G direction and the driven gear 49 is rotated in the F direction, respectively, and the drive force in the E direction is transmitted to the photoconductor drum 19 via the shaft joint 38. Here, by the drive shaft 34 orbiting the belt 39 in the −B direction, the drive force in the −C direction is transmitted to the driven pulley 37. However, the transmission cutoff mechanism 53 cuts off the transmission of the drive force from the driven pulley 37 to the driven shaft 36, so the belt 39 and the driven pulley 37 merely idle and do not affect the driving of the driven shaft 36.

With the drive transmission apparatus 31 according to the present embodiment described above, in a case where the rotation unevenness FL measured by the measurement unit 51 does not meet the condition indicating the limit of the rotation unevenness FL, the control unit 4 causes the swing gear 45 to swing to the second position by the forward rotation of the motor 33, which causes the drive force to be transmitted to the driven shaft 36 via the belt 39 and the driven pulley 37, and in a case where the rotation unevenness FL satisfied a condition indicating the limit of the rotation unevenness FL, the control unit 4 causes the swing gear 45 to swing to the first position by the reverse rotation of the motor 33, which causes the drive force to be transmitted to the driven shaft 36 via the drive gear 41, the swing gear 45, the idle gear 43 and the driven gear 49. Moreover, the transmission cutoff mechanism 53 transmits the drive force that is transmitted to the driven pulley 37 via the belt 39 to the driven shaft 36 in a case where the motor 33 rotates in the forward direction, and cuts off transmission of the drive force that is transmitted to the driven pulley 37 via the belt 39 to the driven shaft 36 in a case where the motor 33 rotates in the reverse direction.

In other words, with the drive transmission apparatus 31 according to the present embodiment, in a case where the rotation unevenness FL meets the condition indicating the limit of the rotation unevenness FL, the drive force is transmitted to the driven shaft 36 via the drive gear 41, the swing gear 45, the idle gear 43 and the driven gear 49, so rotation unevenness FL may be suppressed.

Moreover, with the drive transmission apparatus 31 according to the present embodiment, before the belt 39 is broken, the transmission path of the drive force is switched from the belt 39 and the driven pulley 37 to the drive gear 41, the swing gear 45, the idle gear 43 and the driven gear 49, so it is possible to prevent unexpected downtime due to the breakage of the belt 39.

Therefore, with the drive transmission apparatus 31 according to the present embodiment, it is possible to suppress the rotation unevenness FL and prevent the occurrence of unexpected downtime due to the breakage of the belt 39.

Furthermore, with the drive transmission apparatus 31 according to the present embodiment, in a case where the number of times a rotation unevenness FL of 2% or more and less than 3% is measured reaches 5 times, or in a case where the number of times a rotation unevenness FL of 3% or more is measured reaches 3 times, the motor 33 is caused to rotate in the reverse direction. In other words, in a case where a relatively large rotational unevenness FL is measured, the transmission path of the drive force is switched earlier than when a relatively small rotational unevenness FL is measured. Therefore, with the drive transmission apparatus 31 according to the present embodiment, in a case where the rotation unevenness FL is relatively large, the rotation unevenness FL may be suppressed at an early stage.

Second Embodiment

Figure 8:
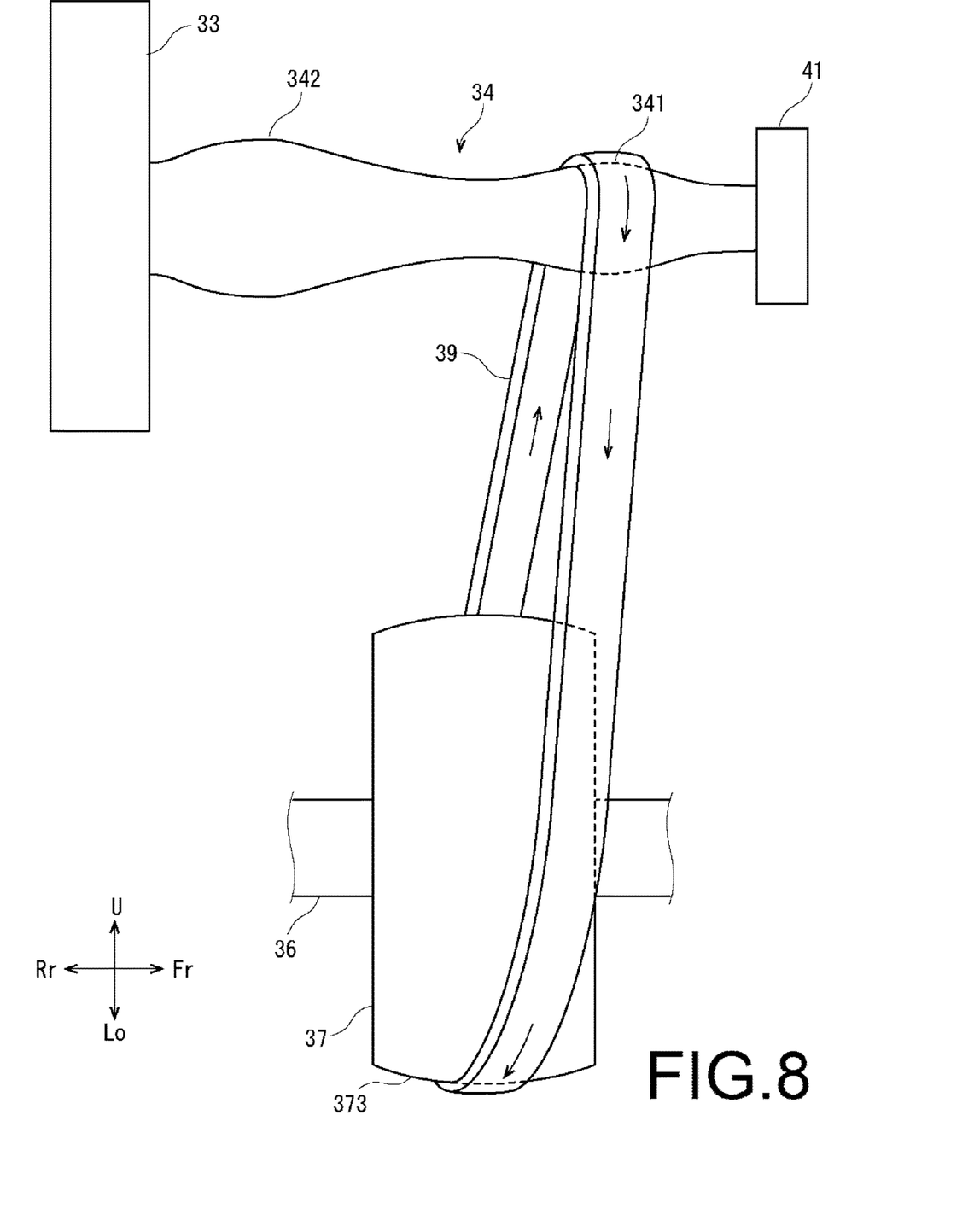
FIG. 8 is a left side view illustrating the operation of a belt in a case where a motor of a second embodiment according to the present disclosure rotates in the forward direction.
Figure 9:
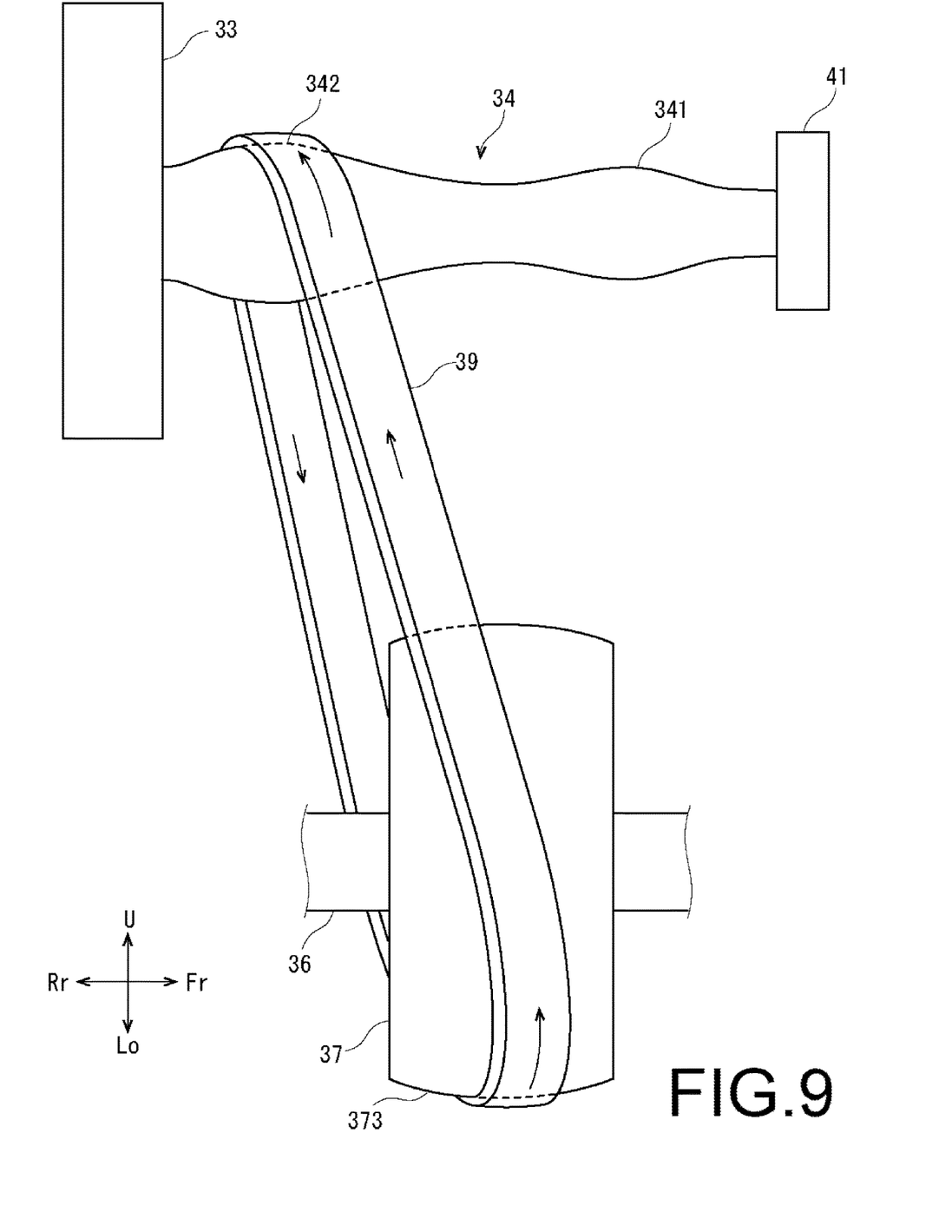
FIG. 9 is a left side view illustrating the operation of a belt in a case where a motor of a second embodiment according to the present disclosure rotates in the reverse direction.

Hereinafter, a printer 1 (an example of an image forming apparatus) and a drive transmission apparatus 31 of a second embodiment according to the present disclosure will be described with reference to FIGS. 8 and 9. FIG. 8 is a left side view illustrating the operation of the belt 39 in a case where the motor 33 rotates in the forward direction. FIG. 9 is a left side view illustrating the operation of the belt 39 in a case where the motor 33 rotates in the reverse direction.

The drive transmission apparatus 31 according to this second embodiment has the following configuration in addition to the configuration according to the first embodiment. A first crowned portion 341 that is crowned in a shape that bulges outward in the radial direction, and a second crowned portion 342 that is crowned in a shape that bulges outward in the radial direction and that has a diameter larger than that of the first crowned portion 341 are formed on the outer circumferential surface of the drive shaft 34. A third crowned portion 373 that is crowned in a shape that bulges outward in the radial direction is formed on the outer circumferential surface of the driven pulley 37 at a position corresponding to the position between the first crowned portion 341 and the second crowned portion 342. In this example, the first crowned portion 341 and the second crowned portion 342 are formed further on the front side and the rear side than the third crowned portion 373, respectively. However, the first crowned portion 341 and the second crowned portion 342 may be formed further on the rear side and the front side than the third crowned portion 373, respectively.

In the initial setting (see FIG. 8), the belt 39 is wound around the first crowned portion 341 and the third crowned portion 373. In the second embodiment as well, the same drive transmission control as in the first embodiment is performed. In a case where the motor 33 rotates in the forward direction, the belt 39 is rotated in the direction of the arrow in FIG. 8. The first crowned portion 341 is located further in the rear than the third crowned portion 373, so in the first crowned portion 341, the belt 39 is pulled from the rear right to the front left (the right is the back side of the paper surface, the left is the front side of the paper surface). On the other hand, in the third crowned portion 373, the belt 39 is pulled from the front left to the rear right. The belt 39 is made of metal, so it is not easily deformed in the in-plane direction. Therefore, as a whole, the belt 39 is driven in a position in which the right side portion is further toward the rear than the left side portion.

In step S19, when the power supply setting is switched so that the control unit 4 rotates the motor 33 in the reverse direction, the drive force drags the belt 39 downward to the right in the first crowned portion 341 illustrated in FIG. 8. Therefore, the belt 39 is moved toward the rear and is pulled from the front left to the rear right by the second crowned portion 342 as illustrated in FIG. 9.

When the motor 33 rotates in the reverse direction in the first embodiment, the idling belt 39 may break, and the belt 39 may become entangled with the components of the drive transmission apparatus 31 and cause a failure. On the other hand, in the present embodiment, in a case where the rotation unevenness FL meets a condition indicating the limit of the rotation unevenness FL, the control unit 4 rotates the motor 33 in the reverse direction to cause the belt 39 to move from the first crowned portion 341 to the second crowned portion 342. Since the diameter of the second crowned portion 342 is larger than that of the first crowned portion 341, so the bending stress of the belt 39 is reduced more in the second crowned portion 342 than in the first crowned portion 341. Therefore, with the drive transmission apparatus 31 according to the present embodiment, the belt 39 is less likely to break when the motor 33 is rotated in the reverse direction, as compared with a case where the first crowned portion 341 and the second crowned portion 342 are not provided.

[Modifications]

The above embodiments may be modified as follows.

In addition to the configuration of the above embodiments, in step S19, the control unit 4 may be configured to transmit information to a service center via a communication line that the belt 39 needs to be replaced. With this configuration, the time from when the rotation unevenness FL satisfies a condition indicating the limit of the rotation unevenness FL until the belt 39 is replaced may be minimized, so that the possibility of the idling belt 39 breaking may be reduced.

In the embodiments described above, an example in which the number of idle gears 43 is one is described; however, instead of this configuration, a gear train having an odd number of idle gears 43 may be provided.

In the embodiments described above, an example of counting the number of times that rotation unevenness FL of 2% or more and less than 3% and rotation unevenness FL of 3% or more are detected is described; however, the threshold value of the magnitude of rotation unevenness FL may be another value. Moreover, in the embodiments described above, an example was described in which in a case where the number of times a rotation unevenness FL of 2% or more and less than 3% is measured reaches 5 times, or in a case where the number of times a rotation unevenness FL of 3% or more is measured reaches 3 times, the motor 33 is rotated in the reverse direction. However, the threshold value of the number of times the rotation unevenness FL above the threshold value is measured may be another value.

In the embodiments described above, an example is described in which the threshold value of rotation unevenness FL that counts the number of detections is divided into two cases: a case in which the rotation unevenness FL is 2% or more and less than 3%, and a case in which the rotation unevenness FL is 3% or more; however, the threshold value of rotation unevenness FL may not be divided into cases, or this may be divided into three or more cases.

Moreover, instead of the number of times the measured rotation unevenness FL is above a threshold value, the control unit 4 may be configured to rotate the motor 33 in the reverse direction in a case where the length of time for which the measured rotation unevenness FL is above the threshold value reaches a threshold value.

In the embodiments describe above, an example is described in which the transmission cutoff mechanism 53 is a ratchet; however, the transmission cutoff mechanism 53 may be a one-way clutch. Moreover, in the embodiments described above, an example is described in which the measurement unit 51 is an optical rotary encoder; however, the measurement unit 51 may be an electromagnetic rotary encoder that outputs a pulse signal of an induced electromotive force or an eddy current when a metal gear rotates. Furthermore, the function of the calculation unit 51C included in the measurement unit 51 may be provided in the control unit 4.

However, the drive device proposed in a typical technique is configured to connect the drive shaft to the auxiliary transmission unit when the drive shaft separates from the pulley when tension is lost due to a broken belt. Therefore, the image formation is performed in a state in which the rotation unevenness becomes large for a certain period before the belt breaks. Moreover, since the gears collide with each other when the drive shaft and the auxiliary transmission unit are connected, so the tips of the gear teeth may be damaged.

According to the present disclosure, it is possible to suppress rotation unevenness and prevent unexpected occurrence of downtime due to a broken belt.

What is claimed is:

1. A drive transmission apparatus comprising:
a motor capable of rotating in a forward direction and a reverse direction;
a drive shaft driven by the motor;
a driven shaft provided at a position that is separated in a radial direction from the drive shaft;
a driven pulley provided on the driven shaft;
a belt wound around the drive shaft and the driven pulley;
a drive gear provided on the drive shaft;
a driven gear provided on the driven shaft and not engaged with the drive gear;
an idle gear engaged with the driven gear;
a swing gear engaged with the drive gear;
a guide member that guides a swing of the swing gear on an arc that is centered on the drive shaft and that connects a first position where the swing gear is engaged with the idle gear, and a second position where the swing gear is not engaged with the idle gear;
a transmission cutoff mechanism that, in a case where the motor is rotated in the forward direction, transmits a drive force that is transmitted to the driven pulley via the belt to the driven shaft; and in a case where the motor is rotated in the reverse direction, cuts off transmission of a drive force that is transmitted to the driven pulley via the belt to the driven shaft;
a measurement unit that measures rotation unevenness of the driven shaft; and
a control unit that controls the motor; wherein
the control unit, in a case where the rotation unevenness measured by the measurement unit does not meet a condition indicating a limit of the rotation unevenness, causes the swing gear to swing to the second position by forward rotation of the motor, which causes drive force to be transmitted to the driven shaft via the belt and driven pulley; and in a case where the rotation unevenness meets the condition, causes the swing gear to swing to the first position by reverse rotation of the motor, which causes drive force to be transmitted to the driven shaft via the drive gear, the swing gear, the idle gear and the driven gear.

2. The drive transmission apparatus according to claim 1, wherein
a first crowned portion that is crowned in a shape that bulges outward in a radial direction, and a second crowned portion that is crowned in a shape that bulges outward in the radial direction and that has a diameter larger than that of the first crowned portion are formed on an outer circumferential surface of the drive shaft;

a third crowned portion that is crowned in a shape that bulges outward in a radial direction is formed on an outer circumferential surface of the driven pulley at a position corresponding to the position between the first crowned portion and the second crowned portion;

in an initial setting, the belt is wound around the first crowned portion and the third crowned portion; and in a case where the rotation unevenness meets the condition, the control unit causes the motor to rotate in the reverse direction, which causes the belt to move from the first crowned portion to the second crowned portion.

3. An image forming apparatus comprising:
a drive transmission apparatus according to claim 1; and
a photoconductor drum connected to the driven shaft.

* * * * *